United States Patent [19]

Tadokoro et al.

[11] Patent Number: 4,819,078
[45] Date of Patent: Apr. 4, 1989

[54] ELECTRONIC PRINT BOARD SYSTEM

[75] Inventors: Joji Tadokoro; Matsusaburo Noguchi, both of Tokyo, Japan

[73] Assignee: Oki Electric Industry Co., Ltd., Tokyo, Japan

[21] Appl. No.: 136,423

[22] Filed: Dec. 15, 1987

[30] Foreign Application Priority Data

Dec. 17, 1986 [JP] Japan .................................. 61-298659
Mar. 30, 1987 [JP] Japan .................................. 62-74479

[51] Int. Cl.$^4$ .......................... H04N 1/00; H04N 1/10
[52] U.S. Cl. ..................................... 358/256; 358/293; 358/296; 358/294
[58] Field of Search ................ 358/256, 293, 280, 294, 358/296, 99; 346/76 PH

[56] References Cited

U.S. PATENT DOCUMENTS 4,587,568  6/1986  Takayama et al. .................. 358/293
4,720,749  1/1988  Satake ................................. 358/293

Primary Examiner—Edward L. Coles, Sr.
Attorney, Agent, or Firm—Spencer & Frank

[57] ABSTRACT

An electronic print board system includes a drawing medium on which images can be erasably written manually, an external input device for supplying external image data, a writer device for erasably writing images on the drawing medium corresponding to the external image data received from the external input device, a device for reading images on the drawing medium and producing output image data corresponding thereto, a device for printing images on a recording medium corresponding to the output image data from the reader device, and a control device for selectively causing the writer device to write images on the drawing medium corresponding to the external image data received from the external input device and for selectively causing the printer device to print images on the recording medium corresponding to the output image data received from the reader device.

9 Claims, 5 Drawing Sheets

ELECTRONIC PRINT BOARD SYSTEM

BACKGROUND OF THE INVENTION

The present invention relates to an electronic print board system comprising a means for optically reading erasable images written or drawn upon a drawing sheet, and for subsequently printing out the image.

Various types of electronic print board systems similar to the present invention have been developed in the past, such as the system shown in FIG. 1.

FIG. 1 is a block diagram showing the control system of a conventional electronic print board system shown in laid-open Japanese Patent Application No. 171695/1984.

This figure shows an endless band drawing sheet 1 supported by a pair of spaced-apart rollers, a conveyer drive 2 for driving the drawing sheet 1, and a lamp 3 for illuminating the rollers supporting the drawing sheet 1.

The figure also shows a mirror 4 for chaanging the light from the drawing sheet 1 to a lens 5. The lens 5 focuses the light reflected from the mirror 4, onto an image sensor 6 which senses the received focused light and thereby optically reads the image from the drawing sheet 1.

Also shown in the figure is a controller 7 for controlling the entire electronic print board system, a memory 8 for storing the image data, a recording paper supplier 9 for supplying a recording paper 10 to a printer 11 for printing the images of the drawing sheet 1 detected by the sensor 6 on the recording paper 10 supplied by the supplier 9, and an operation panel 12 for giving instructions such as for printing, etc.

The operation of a conventional electronic print board system is described below.

To print an image that has been manually drawn on the drawing sheet 1, the operator first writes or draws something on the drawing sheet 1, then inputs a print command using the operation panel 12, whereby the conveyor drive 2 conveys one screen of the drawing sheet 1 past the lamp 3 which illuminates it.

The light reflected from the drawing sheet 1 is redirected by the mirror 4, then passes through the lens 5 which focuses it toward the image sensor 6 that reads it as image data.

The image data are then sent via the controller 7 to the printer 11 which prints images corresponding to the image data fromm the drawing sheet 1 onto the recording paper 10 fed by the recording paper supplier 9.

When it is necessary to print the image onto several sheets of recording paper 10, a command can be input via the operation panel 12 to store the image data in the memory 8 and then to sequentially print the stored image data onto several sheets of the recording paper 10.

However, the conventional electronic print board system configured as described above prints only images which have been written or drawn onto the drawing sheet 1. This means that in which applications such as conferences, in the need arises to study one sheet of reference material, revise the reference material, and to distribute copies to everyone at the conference, the new material must be entirely rewritten and/or redrawn on the drawing sheet 1, or the revised material must be printed onto the required number of sheets of recording paper by a photocopier or the like.

This process interferes with the progress of the conference and does not take full advantage of the electronic print board system's features.

SUMMARY OF THE INVENTION

An object of this invention is to provide an electronic print board system that is able to automatically write one.or several sheets of reference-material images onto the drawing sheet.

According to the invention, there is provided an electronic print board system comprising a drawing medium on which an image can be erasably written manually; an external input means for supplying image data; a writer means for writing images on the drawing medium; a reader means for reading an image on the drawing medium and outputting image data; and a printing device for printing the image data on a recording medium.

In this invention, when the reference material is loaded into the document reader the document reader optically reads the image from the reference material and inputs the image as image data.

Based on this input image data, the write device automatically writes the image from the reference materials onto the drawing sheet.

In conferences and other similar situations, this device not only provides for speedy writing of reference images based on the reference material onto the drawing sheet, but also enables revision of the image of the reference material, with both the original and revised images being printed on the recording paper.

In addition, when several sheets of reference material are loaded into the document reader, the document reader optically reads the several sheets of reference material and inputs them as respective screens of image data.

Next, the respective screens of image data are compressed into one screen by a signal compression processor and, based on the compressed image data, the images from several sheets of reference material are automatically written onto the drawing sheet.

Therefore, the present invention solves the problems inherent in the conventional system described above.

DETAILED DESCRIPTION OF PREFERRED EMBODIMENTS

An embodiment of the present invention is described in detail below based on the attached Figures.

Figure 2:
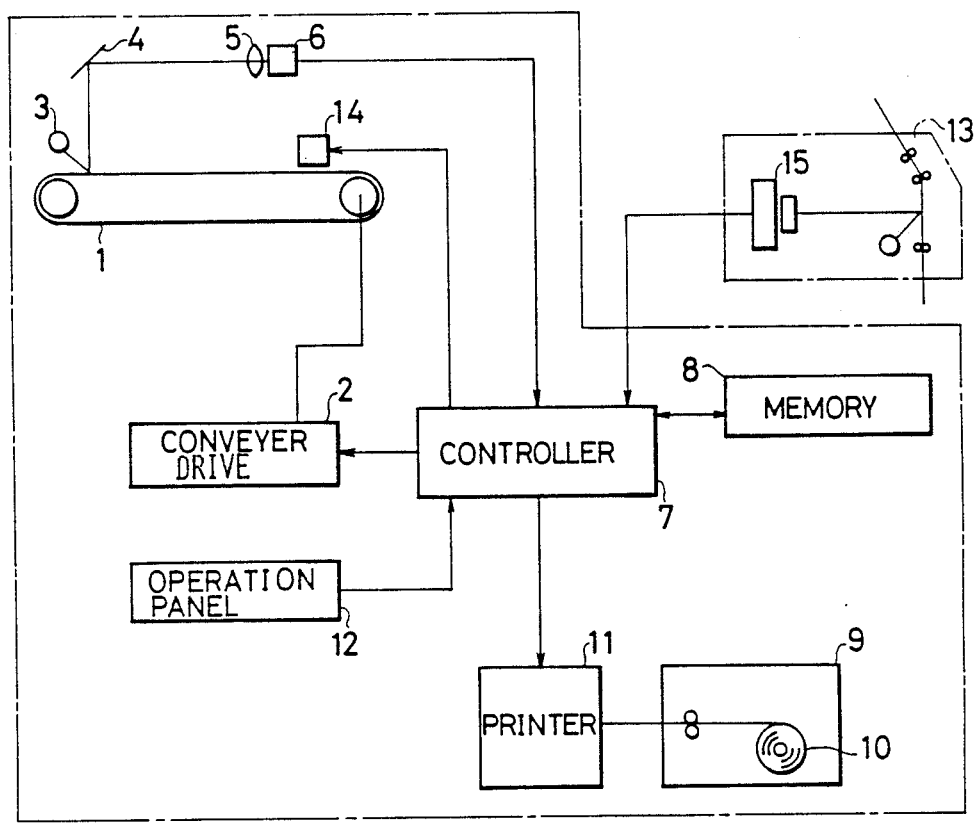
FIG. 2 is a block diagram showing a control system of the electronic print board system relating to the first embodiment of the present invention.

FIG. 2 is a block diagram showing a control system for an electronic print board system according to a first embodiment of the present invention.

Figure 1:
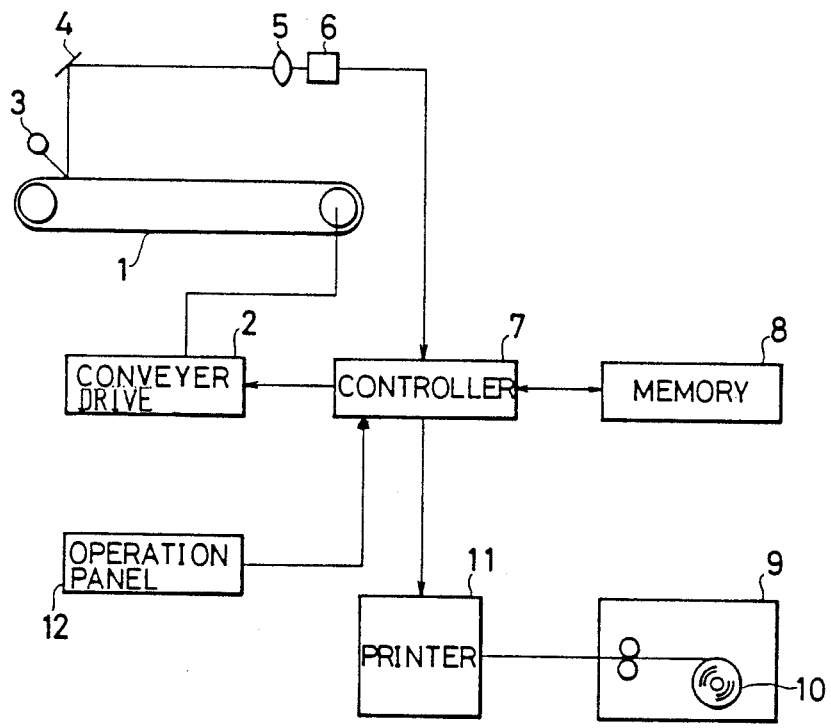
FIG. 1 is a block diagram showing a control system of a conventional electronic print board system.

Although the electronic print board system of FIG. 2 according to the first embodiment has a similar structure to that of the conventional system shown in FIG. 1 described above with similar elements having the same numerals as in FIG. 1, it is distinguished by inclusion of a document reader 13 and a write device 14 which are connected to the controller 7.

The document reader 13 comprises an input image reader 15 for optically reading the externally input document images and transmitting them to the controller 7 as image data.

The write device 14 enables the document images, based on the image data obtained from the documents loaded into the document reader 13, to be written onto the drawing sheet 1 as erasable images. The write device includes a linear heating device (not shown) and linearly-arranged light-emitting diodes (not shown), the functions of which are described hereunder.

Figure 3:
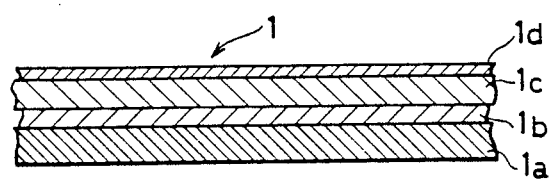
FIG. 3 is a sectional view showing in detail a drawing sheet according to the invention.

FIG. 3 is an enlarged sectional view of a portion of the drawing sheet 1 described above.

The drawing sheet 1 comprises a base film 1a, a photochromic function layer 1b, a polyester layer 1c, and a hard coat layer 1d, layered in that order.

Discussed below is the structure and the image write/erase function of the drawing sheet 1, the photochromic function layer 1b playing a key role in this function.

When the drawing sheet 1 is exposed to heat radiation from the linear heating device (not shown) mounted in the write device 14, the affected portions of the photochromic layer 1b are changed from a solid state to a liquid state. While the affected portions of the photochronic layer are in a liquid state, light from the linearly arranged light-emitting diodes changes and discolors on optical recording substance contained in the photochromic function layer 1b.

The light-emitting diodes emit light selectively in accordance with the image data, and the emitted light is recorded in the optical recording substance in the photochromic layer 16. When the photocromic function layer 1b is then cooled in this changed state, the areas where the optical recording substance was discolored remain discolored as it hardens, and become an image display.

To erase the displayed image, heat is again emitted from the linear heating device mounted in write device 14 to liquefy the solid photochromic function layer 1b, and when this layer is once again cooled it returns to its original blank status.

Described below is the operation of the electronic print or blackboard system comprising an image write/erase mechanism.

When, during conferences or other similar situations, it becomes necessary for the participants to study new material in addition to an image that was manually drawn on the drawing sheet 1 or to append the new material to the image previously drawn an, operator loads the new material into the document reader 13 and inputs a command via the operation panel 12 to direct the write device 14 to write a new image on the drawing sheet 1. At this point, the input image reader 15 in the document reader 13 optically reads the image from the new material loaded as a new document and sends this optically read image as image data to the controller 7.

The image data are sent via the controller 7 to the write device 14 and the write device 14 uses the write/erase mechanism, described above, to write and display an image based on the received image data onto the photochromic function layer 1b of the drawing sheet 1.

The displayed image on the photochromic function layer 1b, together with an image that has been appended as desired by manual use of a marker on the surface of hard coat layer 1d, form a combined image which is detected by the image sensor 6. The image data from the sensor 6 is supplied to the controller 7 which in turn causes the combined image to be printed onto the recording paper 10 by the printer 11.

In cases where several sheets of the recording paper 10 are to be printed upon, the operator inputs a multiple print command via the operation panel 12, which causes the image data that are read to be stored in the memory 8 and then the images are printed onto the desired number of sheets of the recording paper 10 based on the stored image data.

Figure 4:
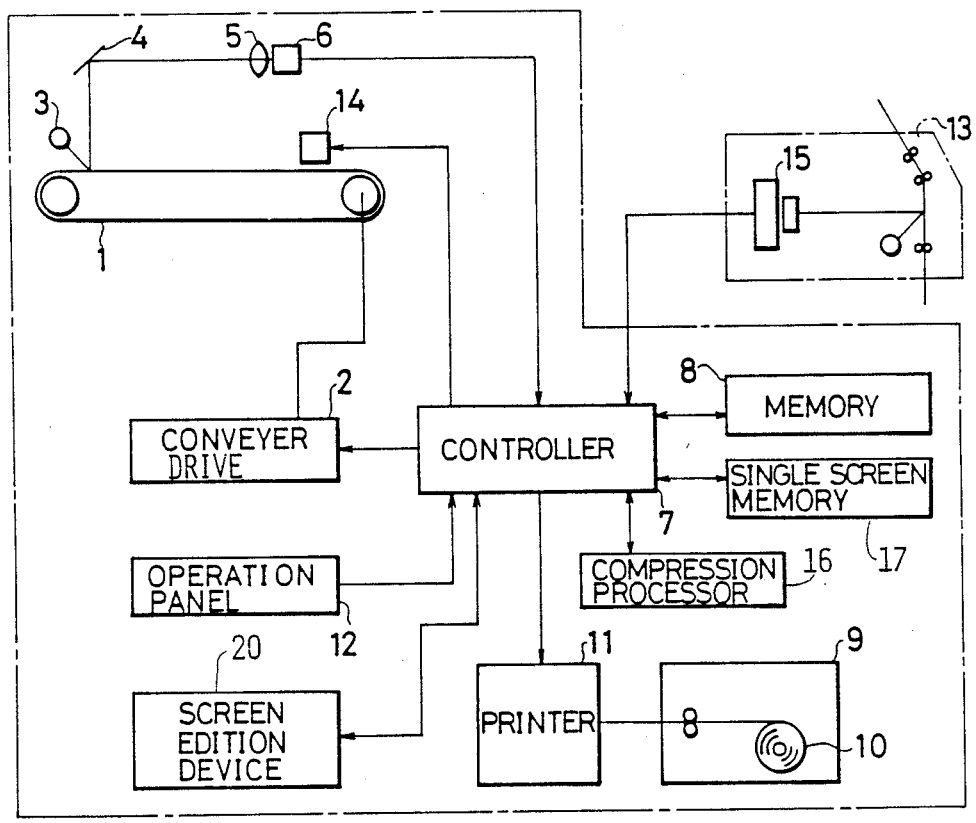
FIG. 4 is a block diagram showing a control system of an electronic print board system relating to a second embodiment of the present invention.

FIG. 4 is a block diagram of an electronic print board system in relation to a second embodiment of the present invention.

The second embodiment of the electronic print board system comprises a nearly identical structure to that of the first embodiment of the same system, and is distinguished by inclusion of a compression processor 16, a single screen memory 17, and a screen edition device 20.

The compression processor 16 performs signal processing to compress several screens of image data received from the document reader 13 via the controller 7.

The compression factor by which the area of each screen of image is compressed may for example be four. That is, the compressed screen of each image could fit in a quarter of the entire screen. The arrangement can be such that the compression factor can be varied or selected by manipulation of operation panel 12.

The single screen memory 17 receives the several sheets of compressed image data from the compression processor 16 via the controller 7 and assigns addresses thereto to enable the compressed screens of image data to be stored as a single full-sized screen of image data.

The screen edition device 20 allots the compressed screens of images to respective parts or quarters of the entire screen. The allotment can be designated by manipulation of the operation panel 12.

Described next is the operation of the second embodiment of the electronic print board system.

During conferences or other similar situations, in cases where it becomes necessary for everyone to study several sheets of new documents, the operator first successively loads the new document sheets one by one into the document reader 13 and then inputs, via the operation panel 12, the command for writing several new screens of images. Each of the new images loaded into the document reader 13 are optically read by the image reader 15 and are sent to the controller 7 as image data. These screens of image data are stored in the memory 8 via the controller 7. The compression processor 16 uses appropriate signal processing to compress the screens of image data as commanded and sends them to the write device 14.

The allotment can be selected by the operator by use of the operation panel 12.

The write device 14 used the write/erase mechanism described above to write and display an image based on the compressed screens of image data onto the drawing sheet 1.

To print several screens of images that have been compressed and edited onto several sheets of the recording paper 10, the operator first inputs the print command for several screens via the operation panel 12, and the compressed screens of image data are then stored in one screen, and the screens of images are printed onto recording paper based on this one screen of compressed image data.

It is not necessary to limit the drawing sheet 1 and the write device 14 to the above configuration, and it is also possible to automatically write the images.

For example, such writing can be performed on a drawing sheet that comprises a liquid layer containing magnetic particles which are drawn to one side as a write device operates thereon.

In addition, if the photochromic function layer is structured so as to react to markers used for manual drawing, the entire image can be erased at once using the write device's image deletion process.

Figure 5:
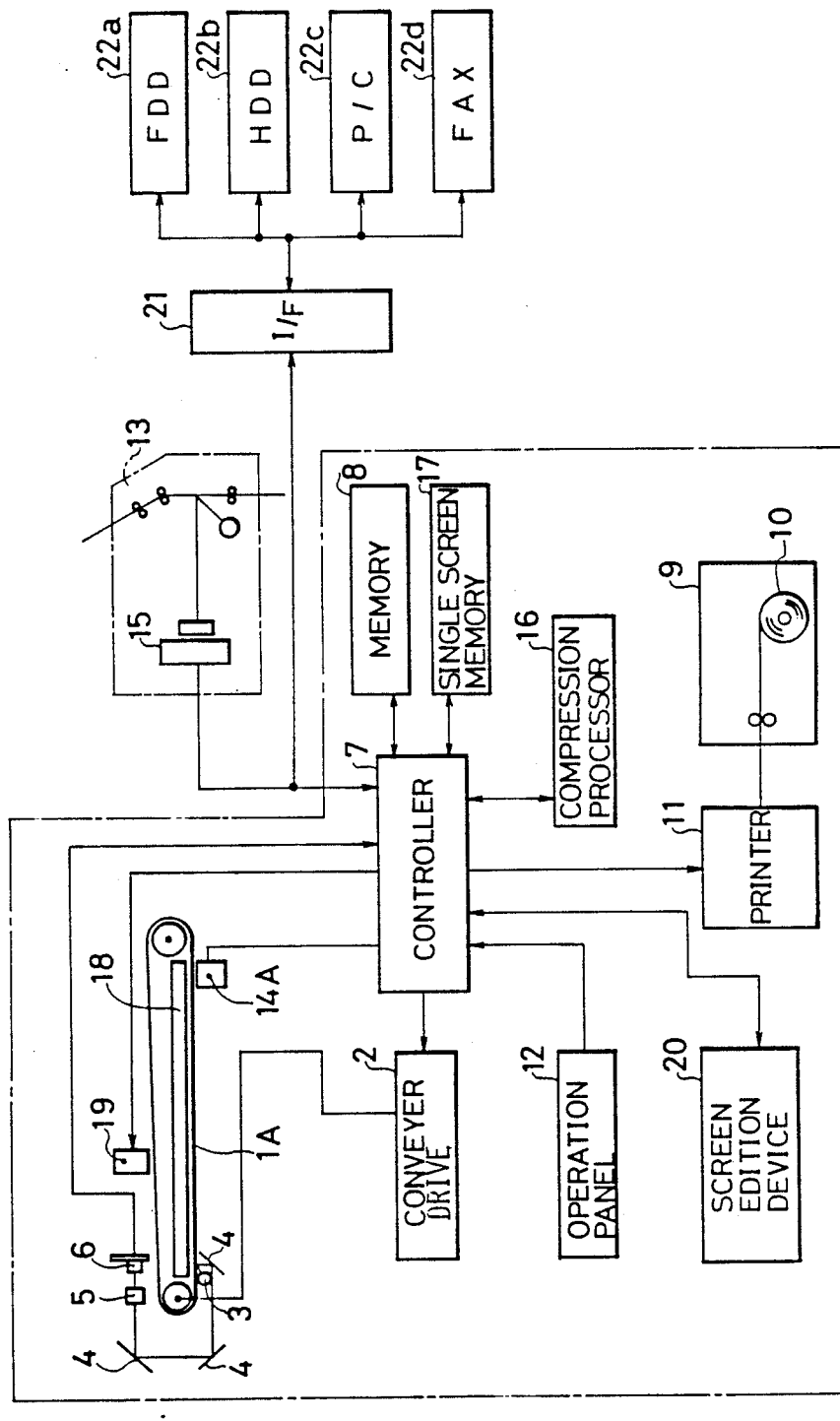
FIG. 5 is a block diagram showing a control system of an electronic print board system relating to a third embodiment of the present invention.

FIG. 5 is a block diagram of a control system for an electronic print board system according to a third embodiment of the invention.

Figure 6:
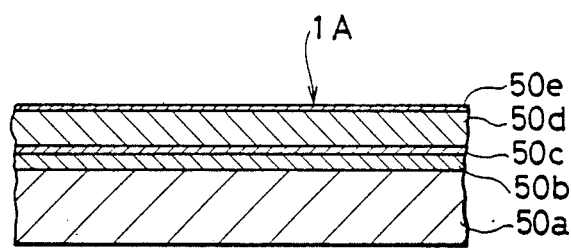
FIG. 6 is a sectional view showing in detail the drawing sheet of the embodiment of FIG. 5.

The invention according to the third embodiment includes a nearly identical structure to that of the second embodiment of the invention described hereinabove. The system of the embodiment of FIG. 4 can be connected via an interface device (I/F) 21 to each of a floppy disc drive unit (FDD) 22a, a hard disc drive unit (HDD) 22b, a personal computer unit (P/C) 22c and a facsimile unit (FAX) 22d. The drawing sheet 1A of FIG. 5 has the structure as shown in FIG. 6, discussed further hereunder. These devices 22a to 22d are alternative types of data input devices, and can be used to supply image data that is to be written on the drawing sheet 1A, particularly an the photochromic function layer 1b. The selection from among these input devices 22a to 22d can be made by the operation panel 12. The system according to this embodiment permits display of the image data from various sources (such as sources 22a through 22d) on the drawing sheet 1A, with or without compression, and also permits subsequent printing of any desired number of images.

The embodiment of FIG. 5 is shown to employ a different example of drawing sheet a drawing sheet, namely the drawing sheet 1A. The details of the drawing sheet 1A of this example is illustrated in cross section in FIG. 6. As illustrated, the drawing sheet 1A includes a base film 50a (50 microns thick), and an adhesive layer 50b (10 microns thick), a heat reversible layer 50c (10 microns thick), a transparent polyester film 50d (25 microns thick) and a hardcoat layer 50e (3 microns thick) which are layered on the base film 50a in the stated order.

The heat reversible layer 50c may be formed of $Ag_2HgI_4$ and changes its color or darkness depending on the temperature, with hysteresis. To write images on the heat reversible layer 50c, heat is selectively applied. For this purpose, the write device 14A of this embodiment comprises a thermal head including a line of thermal dots. When energized, each thermal dot heats the confronting part of the heat reversible layer 50c to about 50° C. The heated part is thereby darkened. A heater panel 18 is provided to maintain the temperature of the heat reversible layer 50c above a certain temperature, e.g., 40° C., to maintain the contents of the writing on the heat reversible layer 50c.

The arrangement for reading the image from the drawing sheet 1A is so modified that it reads the image and is disposed adjacent the edge or underside of the heater panel 18. This is due to the fact that away from the heater panel 18, the image on the heat reversible layer 50c may deleriorate due to the decrease in its temperature.

Additionally, a cooler 19 is provided adjacent the drawing sheet 1A to erase the image on the heat reversible layer 50c. It cools a facing part of the heat reversible layer 50c to a temperature which is below 30° C.

As elucidated in the above description, the present invention comprises a document reader whereby images from external reference material can be optically read and input as image data, and also comprises a write device for writing images from reference material onto a drawing sheet based on the image data provided by the document reader. In conferences and other similar situations, this device not only provides for speedy writing of images of reference materials onto the drawing sheet but also enables revision of the images produced from the reference material. Moreover, both the original and revised reference material's images can be printed on one or more sheets of recording paper.

In addition, a compression processor can be used for compressing several screens of image data into one screen by use of suitable signal processing device, so that, images from several sheets of reference material can be promptly written onto the drawing sheet.

Accordingly, images from several sheets of reference material can be promptly printed onto one sheet of recording paper without requiring any prior preparation of the reference material. As a result, several sheets of the reference material can be seen on a single sheet in any desired combined form. This is also advantageous in that fewer sheets need be printed which in turn results in lower printing costs.

What is claimed is:

1. An electronic print board system, comprising:
    a drawing medium on which images can be erasably written manually;
    input means for supplying image data; writer means for erasably writing images on said drawing medium corresponding to the image data received from said input means;
    means for reading images on said drawing medium and producing output image data corresponding thereto;
    means for printing images on a recording medium corresponding to the output image data from said means for reading; and
    control means for selectively causing said writer means to write images on said drawing medium corresponding to the image data received from said input means and for selectively causing said means for printing to print images on said recording medium corresponding to the output image data received from said means for reading.

2. An electronic print board system according to claim 1 wherein said drawing medium comprises
    a first layer permitting manual writing, and
    a second layer permitting writing by said writer means.

3. An electronic print board system according to claim 1, further comprising
    data memory means for storing the image data supplied from said input means and from said means for reading.

4. An electronic print board system according to claim 1, further comprising a compression processor for compressing several screens of images from said input means and combining into a single screen image.

5. An electronic print board system according to claim 1, wherein said input means comprises an optical reader for reading a document and producing image data corresponding to the contents of the document.

6. An electronic print board system according to claim 2, wherein said second layer is a photochromic function layer which contains an optical recording substance; and said writer means comprises an array of light-emitting diodes.

7. An electronic print board system according to claim 2, wherein said second layer is a heat reversible layer which changes its color depending on its temperature; and said writer means comprises an array of thermal dots.

8. An electronic print board system according to claim 3, wherein said control means also causes said writer means to write images corresponding to the image data stored in said data memory means.

9. An electronic print board system according to claim 4, wherein said control means also causes said writer means to write images corresponding to said single screen of image data from said compression processor.

* * * * *